May 2, 1950 R. S. SMITH 2,505,800
FILLING MACHINE
Filed June 23, 1945 10 Sheets-Sheet 7
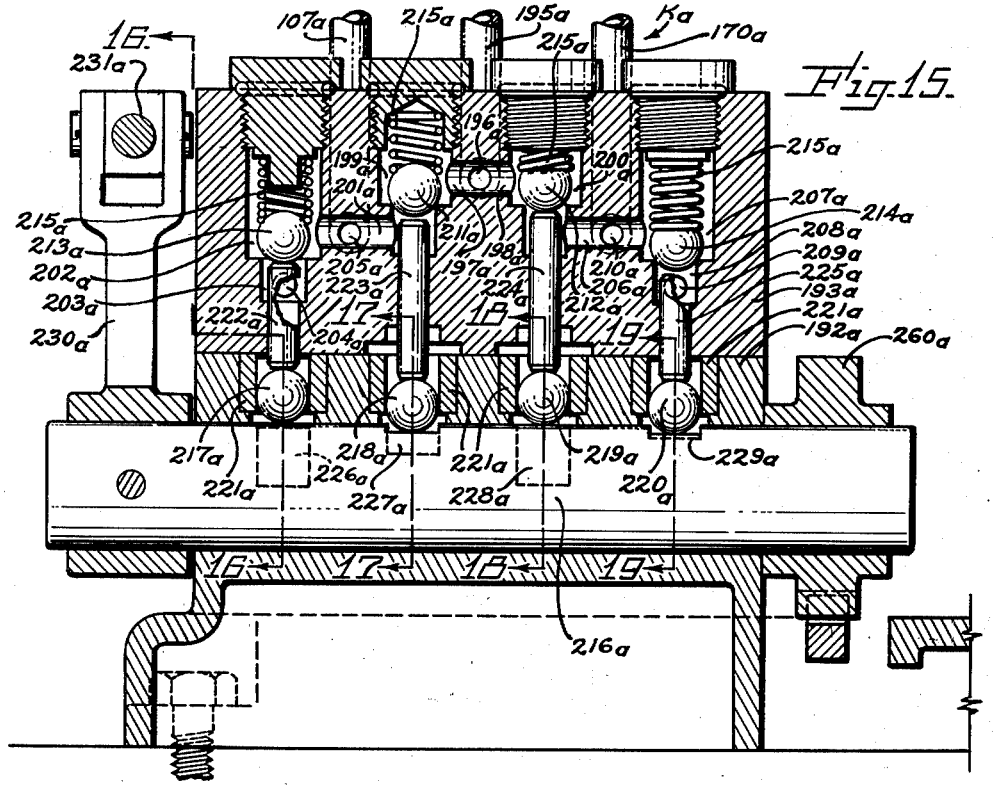
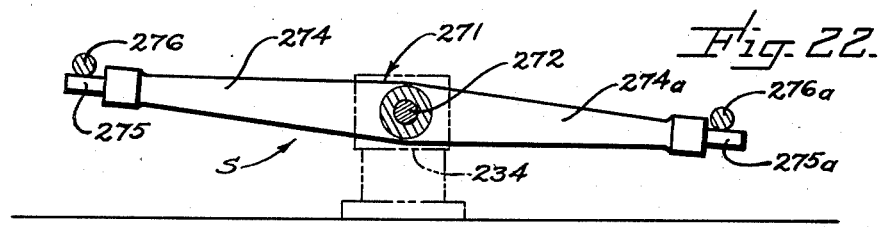
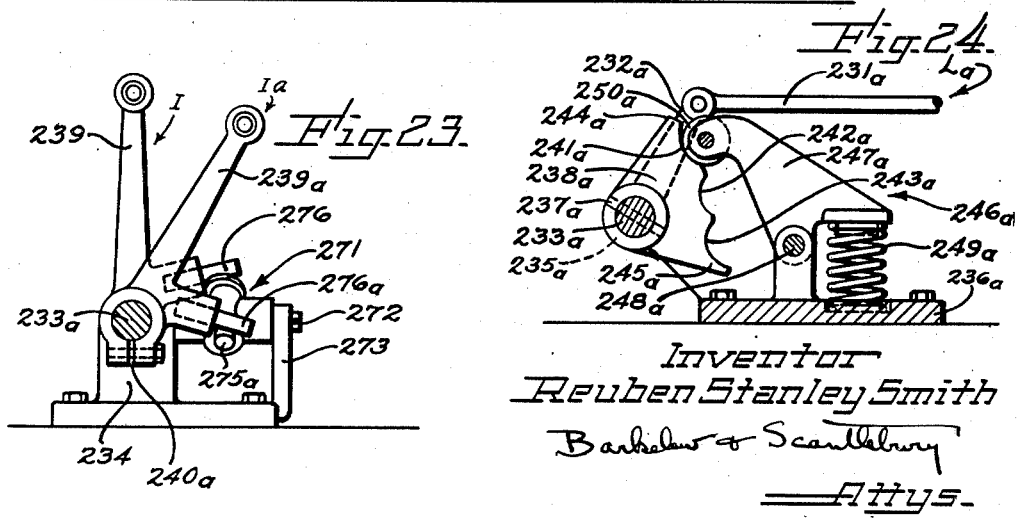
Inventor
Reuben Stanley Smith
Batchelor & Scantlebury
Attys.

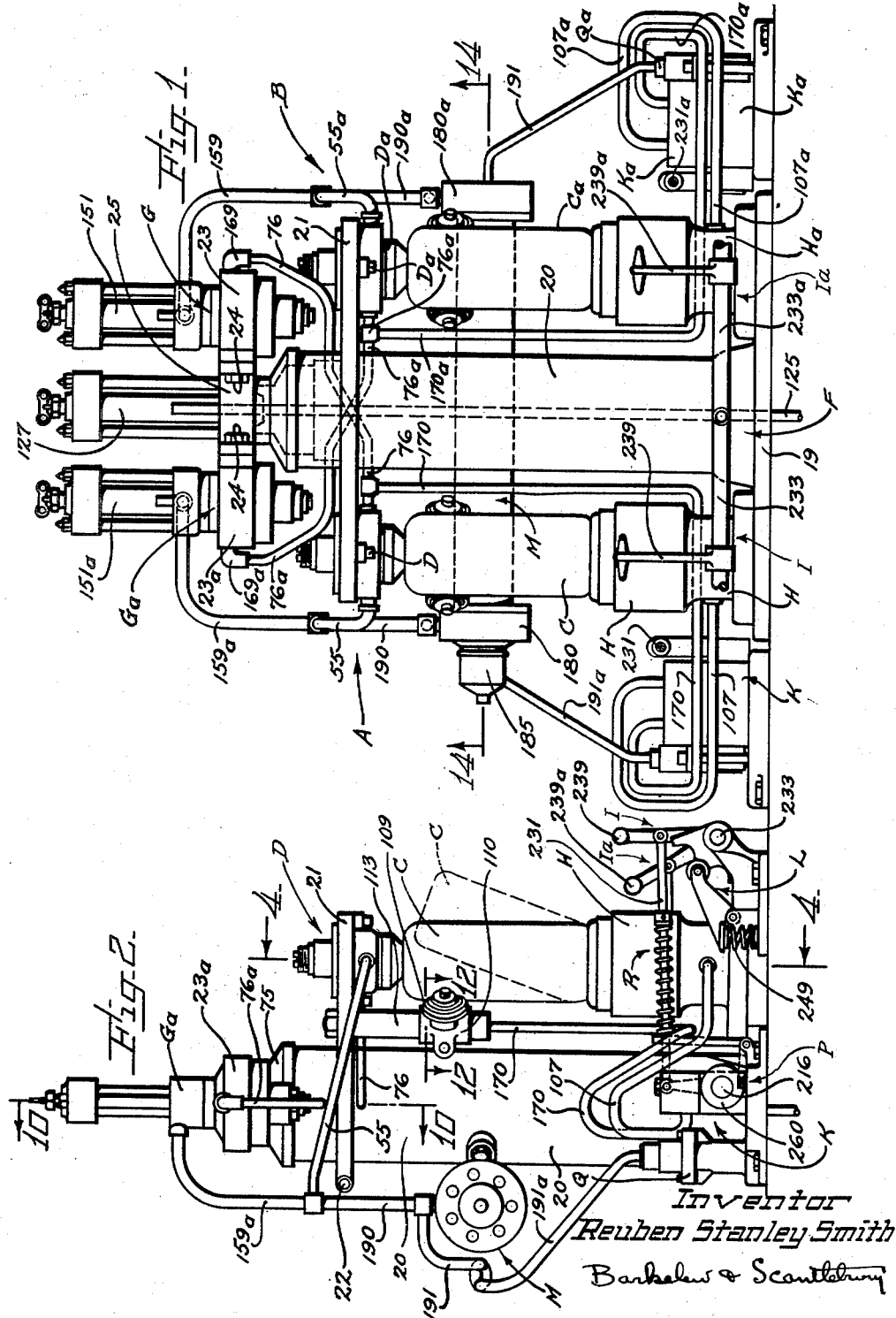

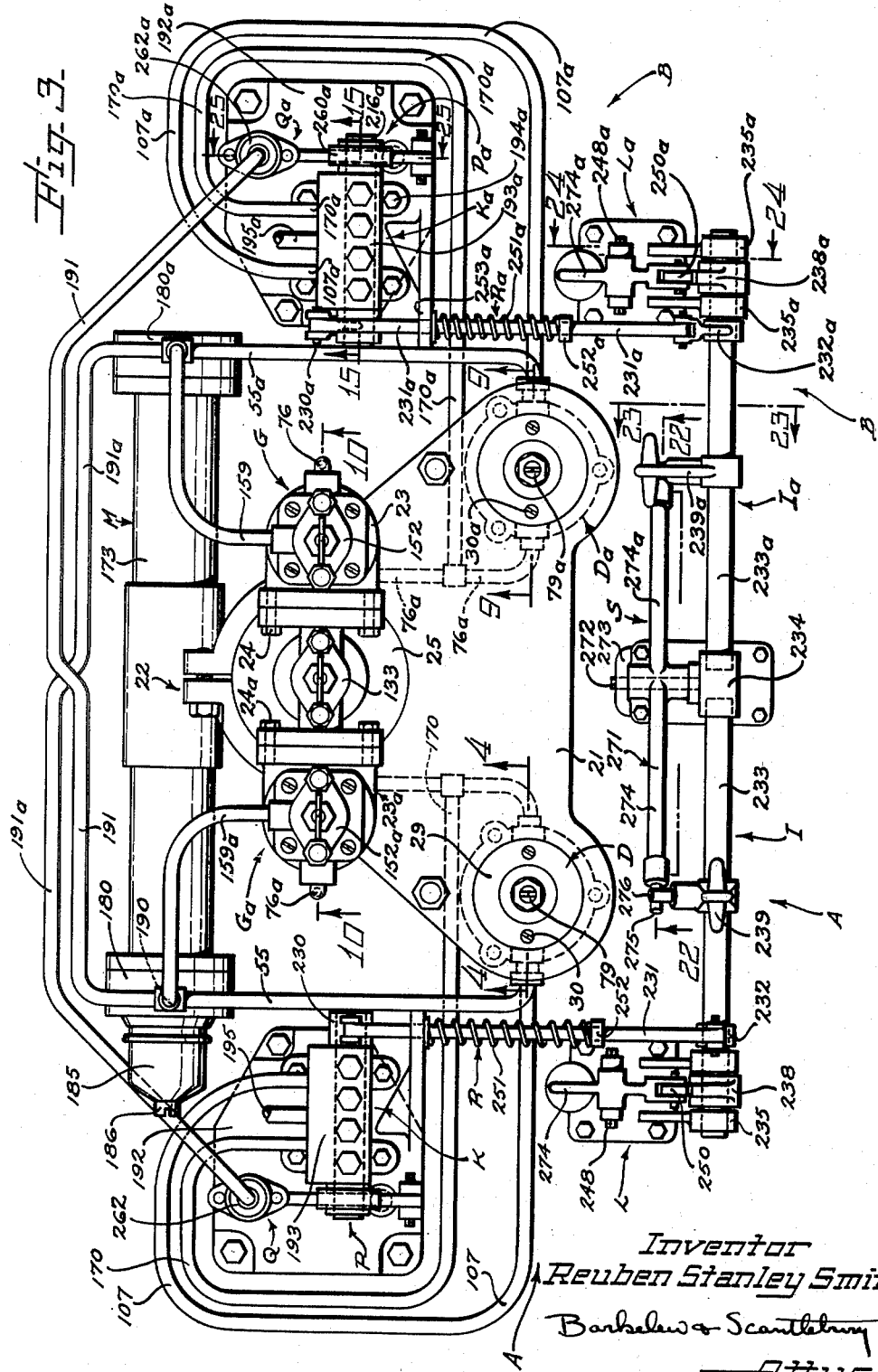

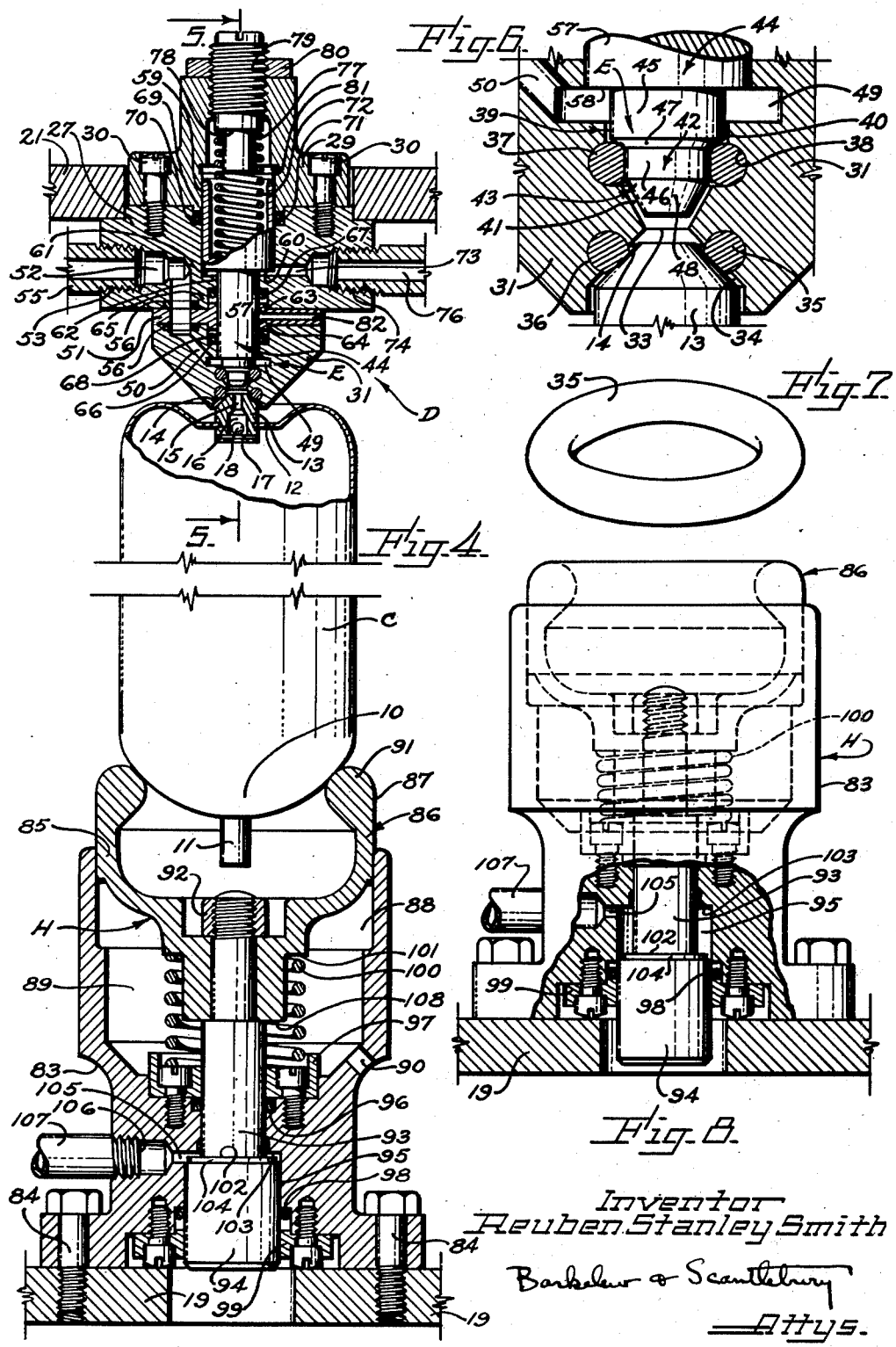

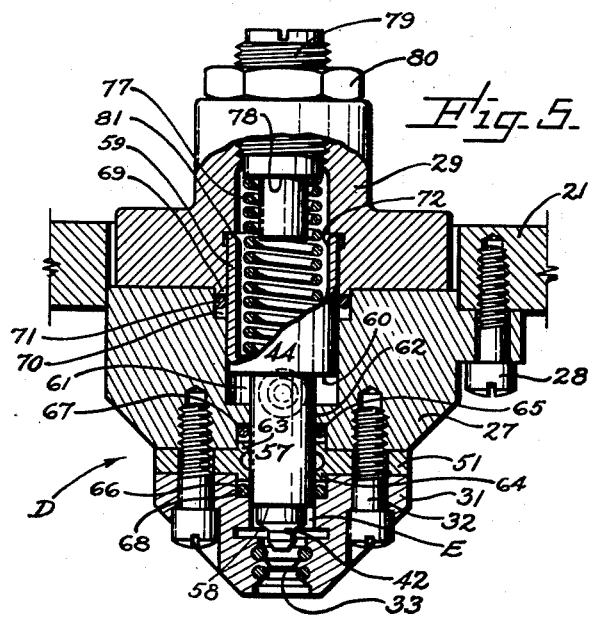
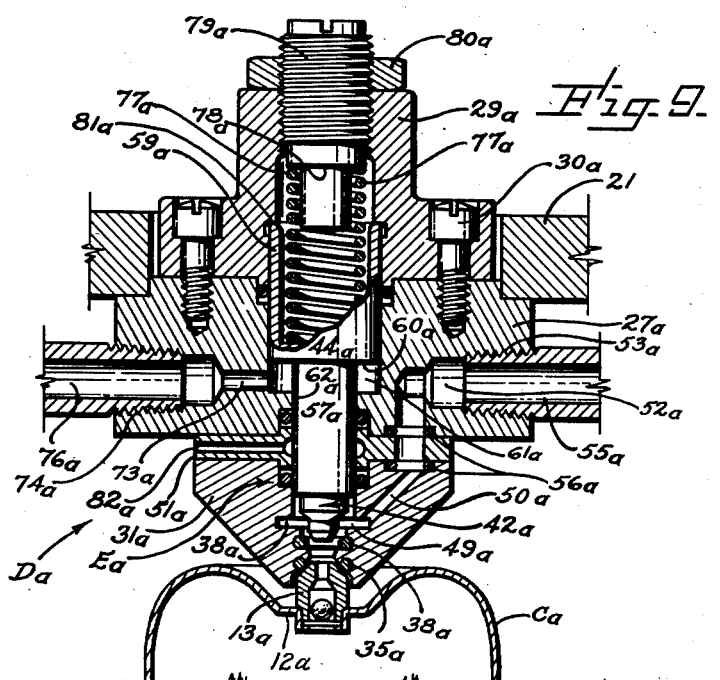
Inventor
Reuben Stanley Smith

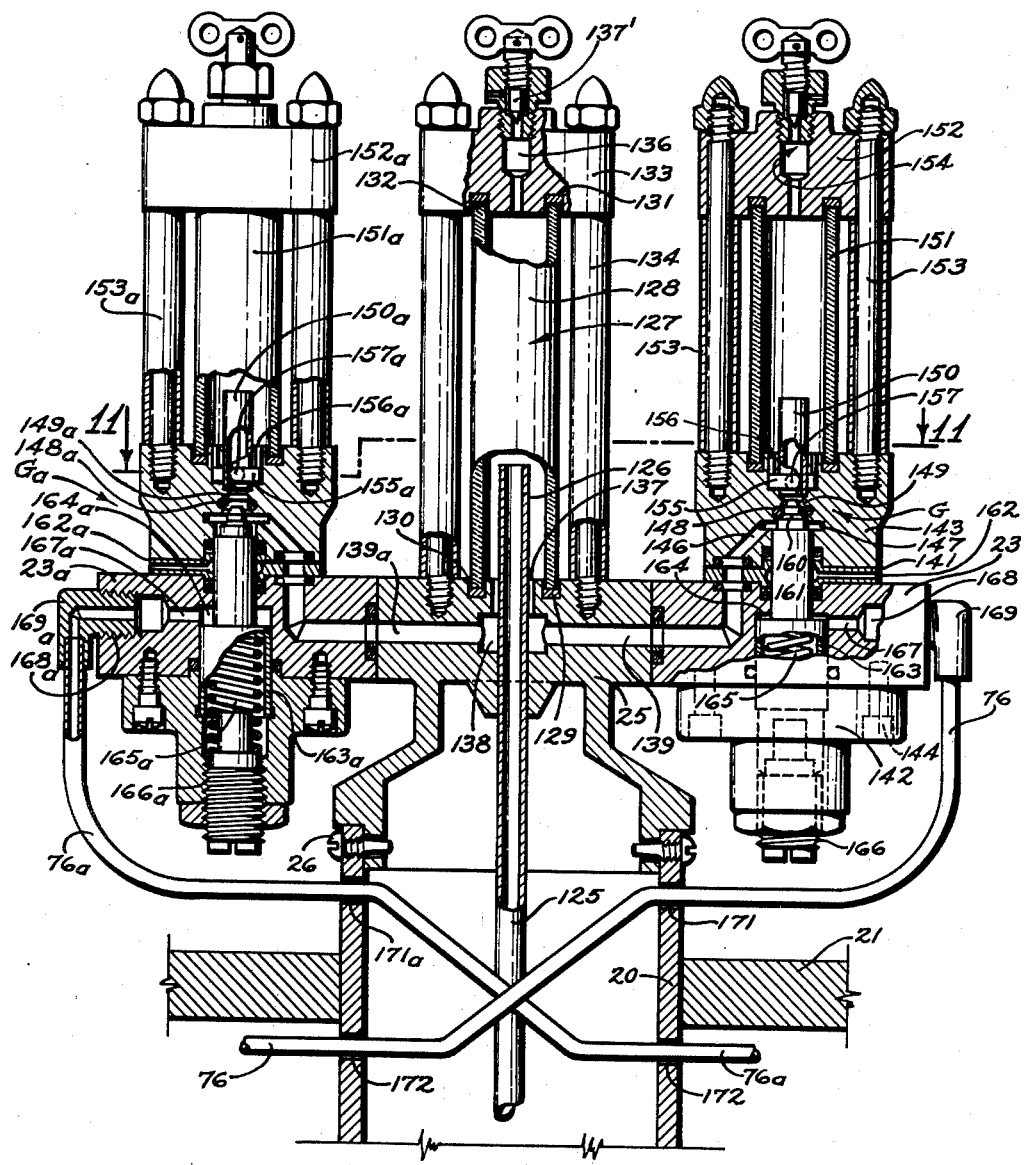

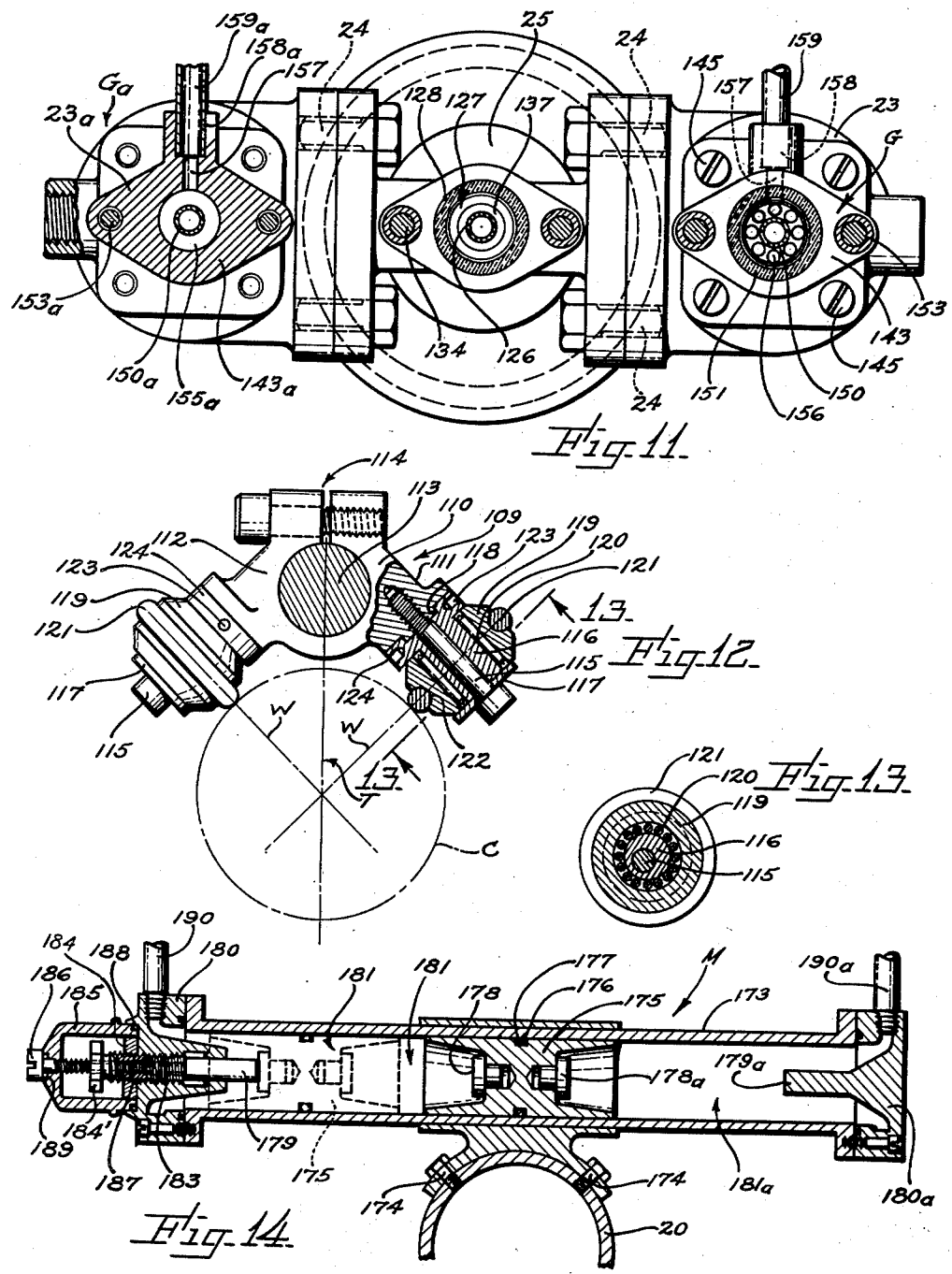

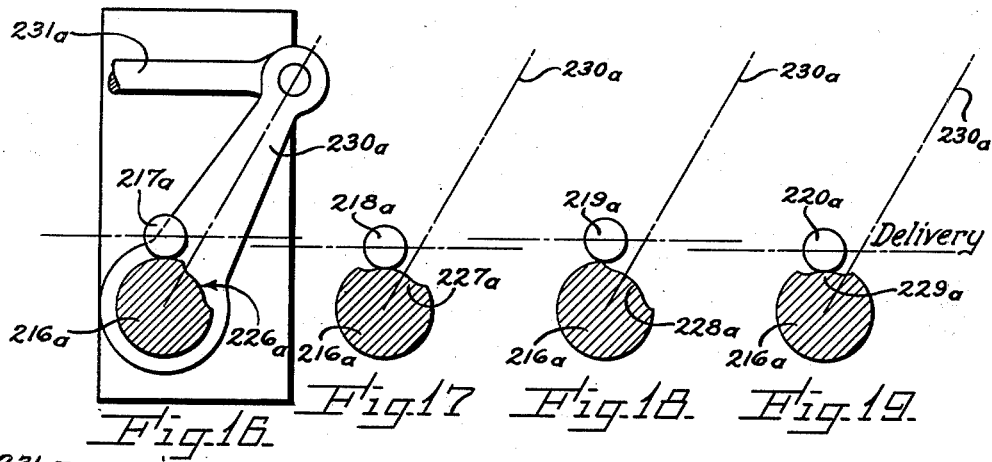
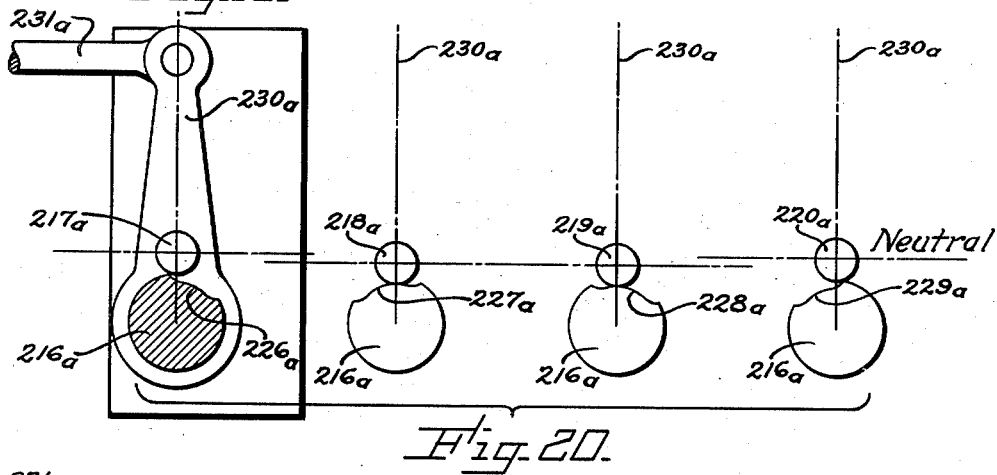
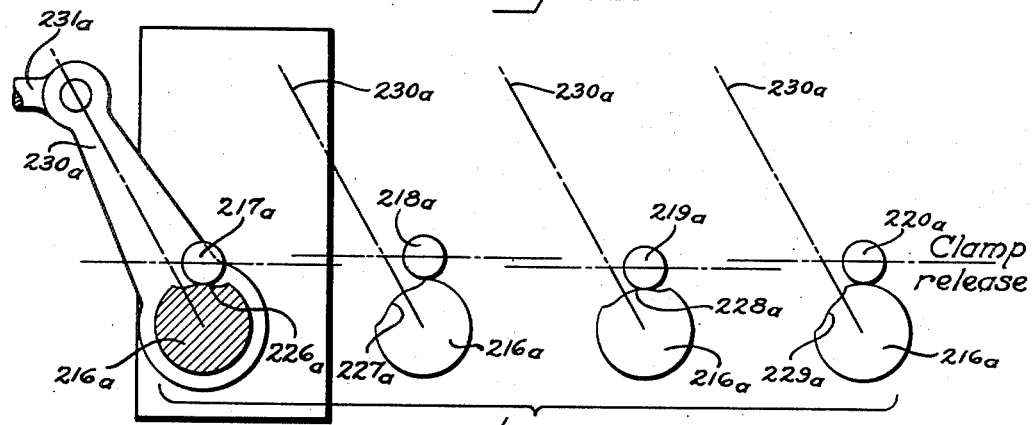

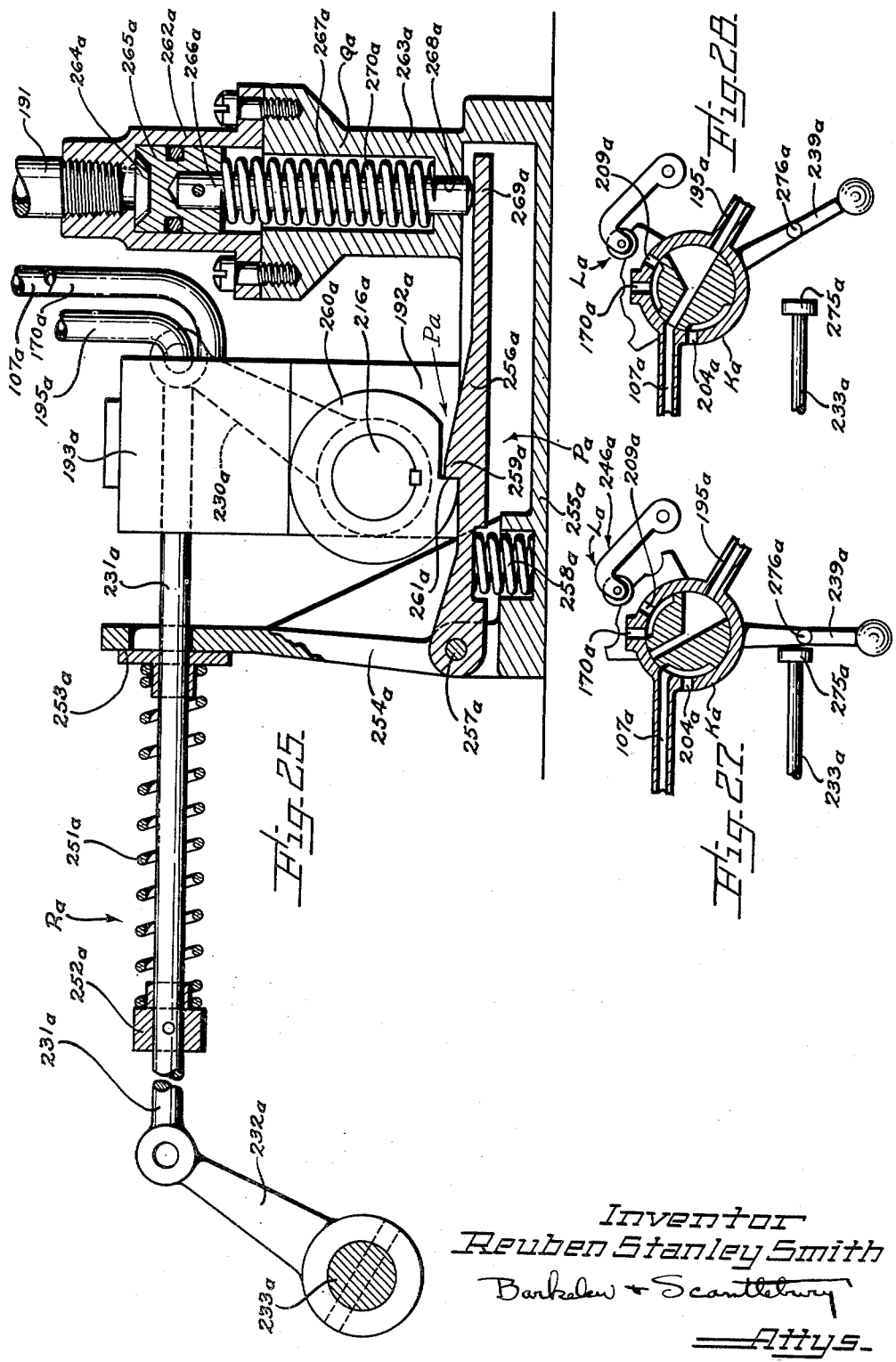

May 2, 1950

R. S. SMITH 2,505,800

FILLING MACHINE

Filed June 23, 1945

Inventor
Reuben Stanley Smith
Barkelew & Scantlebury
Attys.

Patented May 2, 1950

2,505,800

UNITED STATES PATENT OFFICE 2,505,800

FILLING MACHINE

Reuben Stanley Smith, Altadena, Calif., assignor, by decree of distribution, to Jessie F. Smith Application June 23, 1945, Serial No. 601,134

26 Claims. (Cl. 226—93)

This invention has to do generally with filling machines and is more particularly concerned with machines adapted for use in filling containers with volatile liquid.

The difficulties incident to the filling of containers from a source of highly volatile liquids, are well known and it is the major object of the present invention to provide a machine which overcomes these difficulties.

While not at all limited thereto, the filling machine of the present invention is particularly well adapted for use in connection with the partial filling of "pesticide aerosol bombs" with dichlorodifluoromethane, commonly known as "Freon" or "F-12." In most instances the machine is utilized for introducing the "F-12" to the containers after they have previously been partially filled with pyrethrum and sesame oil, but there are occasions where the machine may deliver the complete mixture.

Also, the machine is particularly well adapted for use in a closed, pressurized system such as is disclosed and claimed in my copending application entitled Transfer and recovery system for volatile liquids, Serial No. 601,135, filed June 23, 1945.

Therefore, for illustrative purposes, I will describe the machine and its operation as put to such particular use, but it will be understood that this is in no way to be considered as limitative on the claims appended hereto.

It is among the major objects of the invention to provide means whereby filling may be accomplished with relatively great rapidity and with rapid interchange of full and empty containers. This is accomplished in spite of the fact that during actual delivery to a container, a vapor-tight seal must be established between the filling head and the container. It involves the use of means for quickly and accurately lining up the container with the filling nozzle and then applying a quick-acting, releasable clamp for effecting the vapor-tight seal.

It is also a major object to provide a metering device which insures that the successive deliveries of the machine represent equal volumetric charges, though the meter is preferably adjustable so the volumetric displacement may be altered to compensate for mechanical inaccuracies and to compensate for temperature changes in the liquid, which would otherwise cause a false metering due to changes in the density condition of the liquid, since the measured delivery is ordinarily supposed to represent a given volume of liquid at some predetermined base temperature.

The meter includes a floating piston which is powered by the application of the pressurized liquid to one side thereof, the liquid at the other side of the piston as a result of the preceding power stroke, representing the metered charge which is forced by the piston into one of the containers. I therefore provide novel valvular means for controlling flow into and out of the meter. As an important precautionary measure, I provide means whereby, once delivery has started into a given container, the clamp cannot be released (and therefore the container cannot be removed from the machine, and the vapor tight seal between the filling head and container cannot be broken) until full meter-delivery has been made to the container. Once that delivery has been made, the clamp is automatically conditioned for release actuation.

As means for greatly increasing the capacity of the machine, I prefer to provide dual filling heads serviced by a single meter. Great time-saving is effected by this arrangement since, while one container is being filled, the full container from the other head may be replaced by an "empty," and may be fully conditioned to receive its measured charge of liquid the instant the container at the other head is full.

The features enumerated above are all present in the dual-head type of machine, but I additionally provide an interlock whereby, so long as one head is filling, the liquid-inlet valve to the other head cannot be opened and the flow to and from the meter cannot be diverted. However, the instant said one head has completely delivered its measured charge, the interlock is released and the said other head is in condition to perform its filling function as soon as the operator actuates its control valves. Full, measured delivery from each head is thus assured.

Other objects and features of novelty will be apparent from the following detailed description, reference being made to the accompanying drawings, in which:

Fig. 1 is a front elevation of a machine embodying my invention, the control mechanism at the ends of shaft 233 being omitted;

Fig. 2 is a side elevation of Fig. 1;

Fig. 3 is a top, plan view of Fig. 1;

Fig. 4 is an enlarged section on line 4—4 of Fig. 2, showing only one of the filling heads and one of the clamps, the view being vertically contracted;

Fig. 5 is a section on line 5—5 of Fig. 4, but showing the valve open;

Fig. 6 is an enlarged, fragmentary section showing the nozzle valve and container fitting in the relative positions of Fig. 4;

Fig. 7 is a perspective view of a typical washer used in packing-off various elements of the machine;

Fig. 8 is a view of the container clamp and is similar to the showing of the clamp in Fig. 4, except that it is partially in elevation and shows the clamp in release position;

Fig. 9 is an enlarged, fragmentary section on line 9—9 of Fig. 3;

Fig. 10 is an enlarged section on line 10—10 of Fig. 2;

Fig. 11 is a section on line 11—11 of Fig 10;

Fig. 12 is an enlarged section on line 12—12 of Fig. 2;

Fig. 13 is a section on line 13—13 of Fig. 12;

Figure 26:
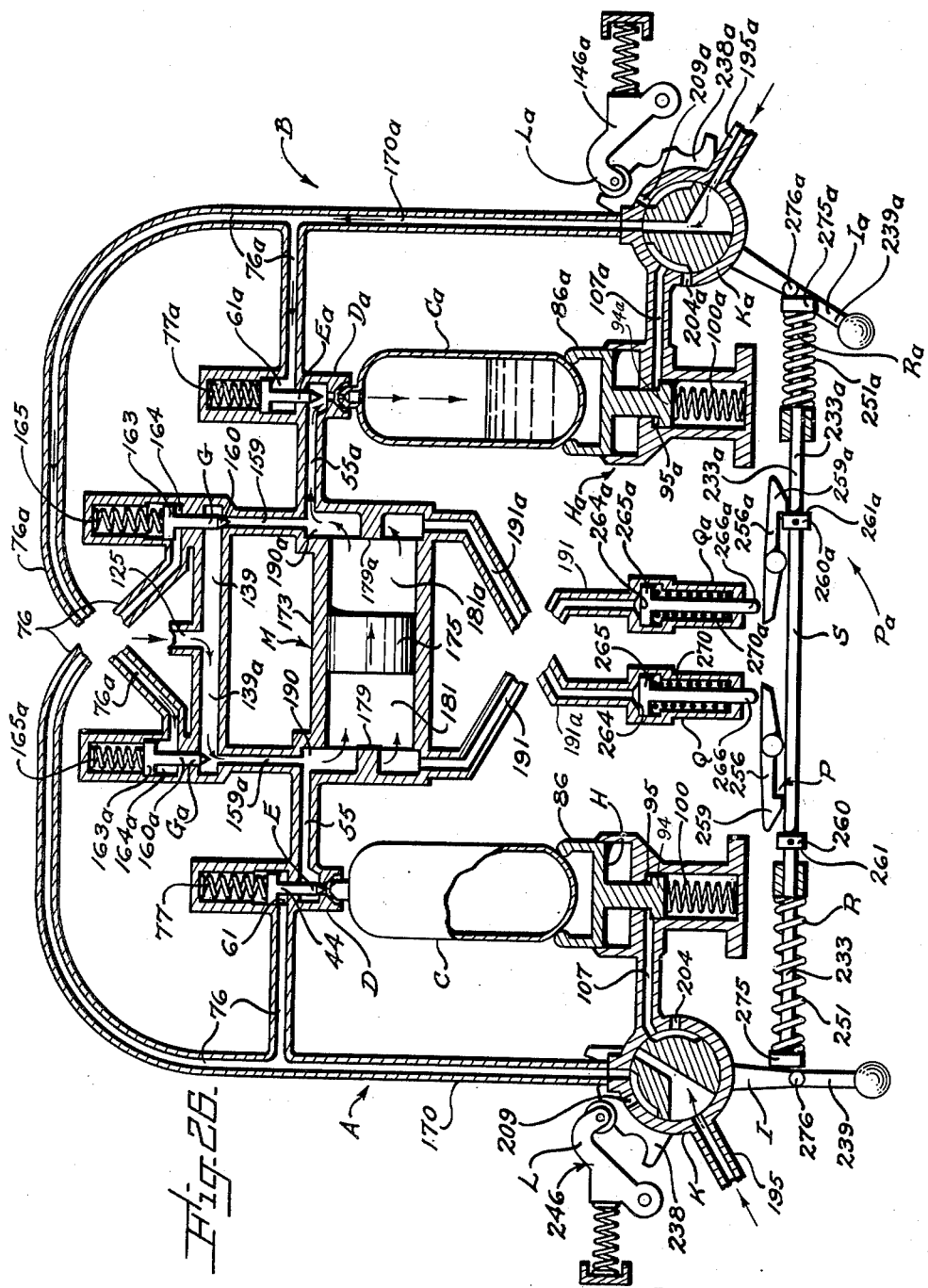

Fig. 14 is an enlarged section through the meter, taken on line 14—14 of Fig. 1, but showing pipes 190 and 190a displaced 90°;

Fig. 15 is an enlarged section on line 15—15 of Fig. 3;

Fig. 16 is a fragmentary schematic section on line 16—16 of Fig. 15;

Fig. 17 is a fragmentary schematic section on line 17—17 of Fig. 15;

Fig. 18 is a fragmentary schematic section on line 18—18 of Fig. 15;

Fig. 19 is a fragmentary schematic section on line 19—19 of Fig. 15;

Fig. 20 is a schematic view showing the cams in "neutral" positions;

Fig. 21 is a schematic view showing the cams in clamp-releasing position;

Fig. 22 is a detached section on line 22—22 of Fig. 3;

Fig. 23 is an enlarged, detached section on line 23—23 of Fig. 3;

Fig. 24 is an enlarged, detached section on line 24—24 of Fig. 3;

Fig. 25 is an enlarged, detached section on line 25—25 of Fig. 3;

Fig. 26 is a view showing the various elements of the machine schematically;

Fig. 27 is a schematic view showing one of the valve controls of Fig. 26 in changed positions; and Fig. 28 is a view similar to Fig. 27 but showing the valve controls in still another position.

Since repeated reference will necessarily be made to the application of different parts of the machine to containers which are being filled thereby, I will first describe a typical container, though it will be understood that this is done solely for illustrative purposes and is not at all to be considered as precluding the use of my machine for filling containers having different characteristics. Thus, containers C and Ca are shown in the form of cylindrical metal bottles adapted to hold volatile liquids such as butane or dichlorodifluoromethane ("F-12") which have very high vapor pressures at normal atmospheric temperature.

Each container has a rounded end 10 with a central and initially sealed-off discharge neck 11, and a depressed end 12 carrying a filling fitting 13 (Fig. 4). Fitting 13 has a conical external seat 14, a filling bore 15 and a counterbore 16, the counterbore and a retainer pin 17 forming a cage for check valve ball 18 adapted to admit the volatile liquid to the container and then to prevent reverse flow.

The machine includes a frame F made up of a base 19, a hollow post 20, a head plate 21 releasably clamped at 22 (Fig. 3) to post 20 for vertical adjustment therealong, and valve heads 23 and 23a bolted at 24 (Fig. 11) to cap 25 which is secured at 26 to the top of post 20.

As mentioned in the forepart of the specification, the preferred, though not limitative, embodiment of the invention includes a plurality of filling units associated to have certain interdependent relation. Therefore I have shown two such units, A and B. Except that the two units are serviced by a single meter M, they are identical and I will therefore use the same reference letters and numerals for corresponding parts, except that the exponent "a" will be added to the reference characters applied to the elements of unit B. A single description of detailed parts will thus suffice for the two units.

Unit A includes, besides meter M, a filling head D, and its valve E, carried by plate 21 (Figs. 4, 5 and 9), a meter valve G carried by head 23 (Figs. 10 and 11, and note that the right hand meter valve is here associated with the left hand filling head), a container holding or clamping arrangement H arranged beneath head D and which is spring-actuated to clamping position and is retractible by application of air pressure (Figs. 4 and 8), control mechanism I (Figs. 2 and 23) for air valve assembly K (Figs. 1 and 15), detent mechanism L (Figs. 3 and 24) for the control mechanism, latch P (Figs. 2 and 25) for the control mechanism and valves, trip mechanism Q (Fig. 25), restoring mechanism R (Figs. 3 and 25) and, in the case of dual-head operation, an interlock S (Figs. 3 and 22) between controls of the two units.

In Figs. 26 to 28 all elements of the units are represented schematically, and the latch and interlocking mechanisms are, for simplicity of showing, altered from the physical form shown in the other views, but their principles of operation are precisely the same.

I will first describe the filling head D and for this purpose will refer particularly to Figs. 4 to 7. The filling head is made up of a body member 27 bolted to plate 21 at 28, cap 29 bolted to member 27 at 30, and nozzle 31 bolted to member 27 at 32 (Fig. 5). The nozzle has a discharge or delivery orifice 33, which also may be considered as the discharge orifice of head D. Orifice 33 opens to conical bore 34 (Fig. 6) which is substantially complementary to fitting-seat 14, and an O washer 35 is sprung into annulus recess 36 for sealing engagement with said seat when the container is clamped in the position of Fig. 4. The O washer 35 is typical of the other washers used in the machine, being made of a synthetic rubber such as "neoprene" which is resistant to the action of liquefied petroleum gases and such liquids as dichlorodifluoromethane. Such washers being in the form of resilient rings (Fig. 7) having circular cross section, have the capacity of "rolling" by turning "inside out" when opposed twisting forces are imposed on their inner and outer peripheries. This characteristic is not of great importance where the washer serves as a seat, as is true of washer 35, but it is of decided advantage where the washer provides a seal for a plunger or piston, as is true in instances later to be described.

Immediately above orifice 33 is the valve E which includes an O washer 37 sprung into annular recess 38 in the wall of bore 39, the bore having a cylindrical portion 40 above the washer and a conical portion 41—flaring oppositely from bore 34—extending below the washer and to orifice 33.

The stopper 42 of valve E comprises a tip 43 integral and coaxial with plunger 44, the tip having cylindrical portions 45 and 46 of relatively large and small diameters, respectively, connected by conical portion or seat 47, the free end 48 of the tip being conical and of the same degree of taper as bore 41. Conical seat 47 and annular portion 46 of the tip are adapted to seat on and deform the washer, as indicated in Fig. 6, thus tightly closing valve E when the plunger 44 is depressed to the position of Fig. 4.

Bore 40 opens to circular chamber 49 into which a duct 50 opens. Duct 50 extends through nozzle 31, disk 51 (which is clamped between the nozzle and body 27 by screws 32) and body member 27 to the horizontal duct 52 in the latter. Duct 52 is enlarged and threaded at 53 to receive pipe 55, the latter being the line for delivering liquid from meter M to head D. The disk 51, nozzle 31 and body 27 are packed off at 56 where duct 50 extends from element to element.

Plunger 44 is, in effect, a differential piston, that is, it presents a plurality of pressure-taking faces which have differential effective areas. Stem portion 57 is of greater diameter than tip portion 45, thus presenting to chamber 49 a downwardly facing, annular, pressure-taking face 58. Head portion 59 is of greater diameter than stem portion 57 and presents a downwardly facing, annular pressure-taking face 60 exposed to the lower end of cylinder bore 61 in body member 27, which bore may be considered as extending upwardly into cap 29 (Fig. 5). Annular face 60 is of much greater area than is face 58.

Stem 57 is adapted to reciprocate through bore 62 in body 27, disk 51, and nozzle 33, while head 59 is adapted to reciprocate through bore 61. Disk 51 has annular flanges 63 and 64 (Fig. 5) which extend into counter bores 65 and 66 of member 27 and member 31, respectively. The interfit of the flanges and counterbores serve as mutual centering means for the members, and the unoccupied portions of the counterbores provide axially elongated recesses to take O washers 67 and 68 which pack off the stem 57 at opposite sides of disk 51. The washers are thus enabled to "roll" during piston reciprocation, with obvious advantage.

The cap 29 and body 27 are similarly centered by interfitting flange 69 and counterbore 70, and the piston 59 is packed off at the joint between cap and body, by O washer 71.

Piston head 59 is hollow, the upper end of hollow 72 opening to the upper end of cylinder bore 61. Opening to the bottom of said bore is horizontal duct 73 (Fig. 4) which is enlarged and threaded at 74 to take the end of tube 76 which supplies the motive fluid—normally compressed air—for opening valve E.

Compression spring 77 is seated in piston hollow 72 and extends upwardly to the annular shoulder 78 on adjustment bolt 79, the latter being threadably supported in cap 29 and being set in adjusted position by lock nut 80. Annular shoulder 81 of cap 29 opposes the upper end of piston head 59 and serves as a positive stop for upward movement of the piston. Spring 77 exerts a constant downward force on the piston, tending to close valve E, and is adjustable through manipulation of bolt 79 to vary the effectiveness of this force.

The seating of stopper 42 on washer-seat 37 limits the downward movement of plunger 44 to an extent that air from duct 73 is always admissible to the lower end of cylinder bore 61. Spring 77 is adjusted to be of sufficient effective force to seat stopper 42 on washer 37 against the maximum liquid pressure applied against plunger-shoulder 58, when the valve is closed, and against that shoulder and all downwardly facing tip-shoulders when the valve is open. On the other hand, the air admitted through duct 73 is of sufficient pressure, acting against the relatively large-area piston face 60, to overpower spring 77 and thus open the valve.

A horizontal bleed passage 82 extends from bore 62 through one side of disk 51, and is adapted to bleed off air, which may leak through packing 67, and liquid which may leak through packing 68.

The control of valve E through the application and release of air admitted to cylinder 61 and the control of liquid flowing to chamber 49 will be described later.

The clamp H (Fig. 4) for applying container C to the filling head, includes a cup-shaped base 83 bolted to plate 19 at 84 and a cylindrical elevator or air-lift 85 which is supported in base 83 for vertical reciprocation. Clamp member 85 includes a cup 86 which is in vertical, axial alinement with nozzle 31, and has a cylindrical portion 87 which fits complementary bore 88 in base 83 to guide the cup in its vertical movement. The base cavity 89 is vented at 90.

The rim 91 of cup 86 is inturned and rounded to take and center the rounded end 10 of container C, fitting 11 being held in the clear. Connected to cup 86 by nut 92 is a depending piston rod 93 carrying piston head 94, the latter being reciprocable through base cylinder 95. Rod 93 is packed off at 96, the packing being retained by ring 97 which surrounds the rod and is bolted to base 83. Head 94 is packed off at 98, the packing being retained by ring 99 bolted to base 83.

A relatively heavy spring 100 is interposed between ring 97 and shoulder 101 on cup 86 and has sufficient effective force to press container fitting 13 into vapor-tight relation with nozzle-ring 35. When the container is clamped to the filling head there is vertical clearance between the annular, upper shoulder 102 of piston head 94 and the annular, base-shoulder 103, but when there is no container in clamped position, these shoulders engage to limit the upward movement of the cup. By adjusting head-plate 21 vertically along post 20, the effective force of spring 100, during such times as a container is in clamped position, may be varied.

The upper end 104 of piston head 94 is of reduced diameter and, opening to the cylinder bore 95 at a point opposite this reduced diameter when the elevator cup 86 is up (Fig. 4) is a horizontal air duct 105 which is enlarged and threaded at 106 to take compressed air supply pipe 107. At certain stages of operation, air is admitted through pipe 107 and duct 105 to cylinder 95 with sufficient effective force to depress piston 94 and hence cup 86 against the resistance of spring 100, the extent of depression being limited by contact of cup-shoulder 108 with ring 97 (Fig. 8). However, the allowed extent of cup-depression is sufficient to permit container C to drop clear of nozzle 31 and then to be withdrawn entirely from the filling machine for replacement by an empty container. Subsequent relief of air pressure within cylinder 95 allows spring 100 to raise cup 86 and clamp the empty can to head D.

The means for controlling the motivating air pressure will be described later.

I have provided adjustable container-locating means in order that the operator may speedily, and without conscious effort, place an empty container on the clamp cup 86 in such position that the filling fitting 13 will line up with nozzle bore 34 and will readily enter that bore when the cup subsequently rises into clamping position. The complementary conical characteristics of fitting face 14 and bore 34 aid by providing final centering means for the fitting, during the last stages of upward movement of the container, and cup-rim 91 centers the bottom of the container.

The container locating means is generally indicated at 109 (Figs. 12 and 13) and comprises a hub 110 from which arms 111 and 112 radiate to form a centering V. Hub 110 is slidably and rotatably mounted on suspension post 113 which depends from plate 21. Clamp 114 provides releasable means for locking the hub in adjusted position on post 113. Post 113 and locator 109 are so located, that the common, vertical axial plane T of the post, the filling head and elevator cup 86, approximately bisects the 90° angle included between arms 111 and 112.

The arrangements at the free ends of the two arms are identical, so only one will be described in detail. Arm 111 carries a co-axial bolt 115 upon which is mounted an eccentric bushing 116 and a clamp washer 117. When bolt 115 is loosened, the bushing may be rotated about the bolt and the centering annulus 118 on arm 111. On the other hand, tightening of the bolt clamps the eccentric bushing against such rotation. Roller 119 is mounted for free rotation about bushing 116 through the medium of roller bearings 120. A resilient ring 121, of "neoprene" or the like, is sprung into annular groove 122 of the roller, and it is this ring which directly contacts the containers. The rollers are preferably so located on their respective arms that the projected, medial transverse planes W of rings 121 intersect at the common axis of head D and clamp H.

It will be seen that by loosening bolt 115, and then rotating bushing 116 through the application of a tool to sockets 123 in the flange 124 of bushing 116, the axis of rotation of the roller may be shifted radially towards or away from the common axis of the filling head and clamp, and, with the bushing clamped in the new position, the roller thus provides a newly positioned stop for the container. It is obvious that the eccentric mounting of the rollers provides for accurate adjustment of the locator stops, and allows the reception of containers of different diameters.

Hub 110 and rollers 119 are adjusted to a given container so when the container is placed in a tilted position (dotted lines of Fig. 2) with its lower end engaged with rim 91, it need merely be rocked toward upright position, with the assurance that when the container strikes rollers 119, it is properly centered and fitting 13 is in vertical alinement with the nozzle bore. As the container is subsequently elevated by cup 86 to clamped position, rollers 119 are free to rotate about their associated bushings, and therefore they continue to locate the container without interfering with the vertical movement thereof and without marring or damaging action. If the locator rollers are not quite accurately set, the resilient roller-rings 121 will yield sufficiently to allow fitting 13 to seat properly in nozzles 31.

Pressurized liquid arrives at the machine via line 125 (Figs. 10 and 11) which extends through the hollow post 20 and cap 25, the line terminating in a stand pipe 126, from which the liquid is delivered to air trap 127. Trap 127 comprises a transparent tube 128 whose lower end is seated on packing 129 in cap groove 130. The upper end of the tube is seated on packing 131 in the groove 132 of head 133, the hold-down bolts 134 clamping the tube to cap 25. Head 133 has an air bleed duct 136 which is controllable by bleed valve 137'. Air entrained in the incoming liquid will gather in the top of tube 128 and the consequently depressed level of the liquid in the trap will be visible through the transparent tube, whereupon the operator relieves the condition by opening valve 137' and bleeding off the air.

The liquid within the trap flows downwardly through annular duct 137 into the annular chamber 138 in cap 25. Ducts 139 and 139a open from diametrically opposite sides of chamber 138 and lead, respectively, to valves G and Ga, which are identical, except that when one is closed, the other is always open.

Valve G includes head 23 (into which duct 139 is extended), disk 141, cap 142, and block 143, which are in mutual axial alinement. The cap is bolted to head 23 at 144; and block 143 and disk 141 are bolted to the head at 145 (Fig. 11). An angular duct 146 connects duct 139 with chamber 147 in block 143, an O ring 148 forming a valve seat between that chamber and orifice 149 which opens to standpipe 150. The latter extends upwardly into an air trap in the form of a transparent tube 151, capped at 152 and held to block 143 by bolts 153, in the manner described in connection with the air trap 127. An air bleed valve 154 is provided in cap 153.

The bore of tube 151 is in communication with block-chamber 155 through vertical ducts 156, and leading horizontally from this chamber is a duct 157 which is enlarged at 158 to receive a tube 159 (Fig. 11) which runs to meter M and tube 55a, as will later appear. Trap 151 thus serves to collect and bleed off air which may be entrained in the liquid flowing from the meter, thus insuring accurate volumetric delivery of liquid from the meter.

Valve G is the counterpart of the previously described valve E, except that it is turned end for end, and therefore its construction and operation need not be described in detail. However, it may be stated that stopper 160, stem 161, bleed port 162, piston head 163, cylinder 164, spring 165, spring adjustment 166, and air duct 167, correspond, throughout, in construction and operation, with the previously described and respectively similar elements 42, 57, 82, 59, 61, 77, 79 and 73.

Duct 167 is enlarged at 168 to take fitting 169 of compressed air pipe 76 which enters one side of post 20 through opening 171, crosses through the hollow of the post, leaves through opening 172 at the other side of the post, and is connected to valve E (Fig. 4). Pipe 76 is also branched at 170 (Fig. 1) to provide communication with air valve K, which will be described later.

Meter M is shown in Fig. 14 and comprises a horizontal cylinder 173 bolted at 174 to post 20, and a floating piston 175 having an O ring 176 in its axially elongated and centrally located annular groove 177. For sake of lightness, piston 175 is preferably made of aluminum, but has central, hardened steel plugs 178 and 178a to coact with stops 179 and 179a on cylinder heads 180 and 181a, respectively. The portions of the bore of cylinder 173 which lie at the left and right of piston 175 are designated at 181 and 181a, respectively.

At least one of the stops (stop 179, for instance) is preferably adjustable to vary the displacement stroke of piston 175, thus to enable regulation of the displacement volume of the meter. Such regulation may be effected when it is desired to change the extent to which a container is to be filled, or to compensate for temperature and density changes in the liquid, which changes would otherwise vary the effective extent of delivery based on some certain predetermined temperature.

Stop 179 is in the form of a plunger having threaded connection with cylinder head 180 at 183, a lock-nut 184 and a tool-taking head 184' being provided on the plunger at the outer end of the head 180. A cap 185, for normally closing in the lock nut and the exposed end of plunger 179 is detachably held to head 180 by screw 186 threaded into plunger bore 187, the cap being packed off at 188 and 189. The cap prevents the escape of liquid which may leak through threads 183, but may be detached, after removal of screw 186, for adjustment of stop 179.

Tubes 190 and 190a lead from opposite ends 181 and 181a of the cylinder; tube 190 being connected with tubes 55 and 159a (Figs. 1 and 2) and tube 190a being connected with tubes 55a and 159. Tubes 190 and 190a are also branched at 191 and 191a, respectively, these branches connecting with trip mechanisms Qa and Q, respectively, which mechanisms will later be described. In Fig. 26, branches 191 and 191a are represented as opening to the meter cylinder separately from pipes 190 and 190a, but this is done merely to simplify the schematic showing and does not alter the principles of flow and operation.

Valves E and G are always opened and closed simultaneously, as are also valves Ea and Ga, but when one set of valves E and G or Ea and Ga are open, the other set is closed. These valves control the flow of liquid to and from meter M and to the container. The valves, in turn, are controlled by air pressure applied through tubes 76 and 76a, while clamps H and Ha are controlled by air pressure admitted through pipes 107 and 107a, respectively. In connection with the liquid control valves, it will later be seen that when the meter piston 175 reaches either end of its stroke (meaning that a full, metered charge has been delivered to the container), further pressurized delivery to the container ceases. However, it will also be pointed out that when the piston comes to rest at one of the stops 179 or 179a, the open, liquid-flow control valves are automatically closed; the valves E and Ea closing the liquid lines directly at the delivery orifices and thus preventing leakage from and vaporization in the lines when a full container is removed from the previously active filling head.

I will now describe the valves K and Ka (Fig. 15) which control the air pressure lines to the several valves and to the air-clamps H and Ha. The valves are identical and corresponding parts will be given similar reference numerals, except that the numerals applied to valve Ka will be given the exponent "a." Since, in the later description of a cycle of operation, reference will be had mainly to the condidition of valve Ka, I will describe the details of that valve and its controls.

Referring particularly to Fig. 15, valve Ka is illustrated as made up of base or housing section 192a secured to base plate 19, and housing section 193a, the sections being bolted together at 194a (Fig. 3). A pipe 195a leads from a source of compressed air to chamber 196a in section 193a, the chamber opening through ducts 197a and 198a to chambers 199a and 200a, respectively. Duct 201a leads from chamber 199a to chamber 202a which is adapted to be opened to exhaust chamber 203a, from which an exhaust port 204a leads to the atmosphere. Pipe 107a, from clamp cylinder 95a, opens to duct 201a at port 205a.

Duct 206a leads from chamber 200a to chamber 207a which is adapted to be opened to exhaust chamber 208a, from which an exhaust port 209a leads to the atmosphere. Pipe 170a, leading from air cylinders 61a (Fig. 9) and 164a (Fig. 10) via pipe 76a, opens to duct 206a at port 210a.

Valve balls 211a, 212a, 213a and 214a are provided in chambers 199a, 200a, 202a and 207a, respectively, being urged downwardly by individual springs 215a towards positions closing the individually underlying ducts and chambers. When in closing or "full-down" positions, balls 211a and 212a close the passageways from inlet 196a to ducts 201a and 206a, respectively; ball 213a closes duct 205a from exhaust port 204a; and ball 214a closes duct 206a from exhaust port 209a.

The valve balls are selectively moved up from their seats against the action of springs 215a by oscillation of cam shaft 216a journalled in housing section 192a, the cam shaft acting on wear-balls 217a, 218a, 219a and 220a which are guided for vertical bodily movement and against horizontal bodily displacement by bushings 221a in section 192a. Thrust pins 222a, 223a, 224a and 225a are mounted for vertical reciprocation in section 193a, and, through these pins, upward movement of balls 217a, 218a, 219a and 220a causes coincident upward or opening movement of valve balls 213a, 211a, 212a and 214a, respectively.

Balls 217a, 218a, and 219a and 220a are adapted to be actuated by cams 226a, 227a, 228a and 229a, respectively, on shaft 216a, the nature and relationship of which are clearly shown in Figs. 16 to 21. They are timed so that a certain amount of overlap in valve-operation exists. For instance, where the cam shaft is capable of rotating 30° to each side of center (as in the illustrated case) cam 226a keeps exhaust valve 213a open while the cam shaft is rotated through several degrees immediately at the left of center and through the full 30° at the right of center. Cam 229a keeps exhaust valve 214a open while the cam shaft is rotated through several degrees immediately at the right of center and through the full 30° at the left of center. On the other hand, cams 227a and 228a hold open inlet valves 211a and 212a, respectively, only through about 15°, each, at the opposite ends of the oscillatory movement of the cam shaft.

Thus, a given inlet valve is closed before its associated exhaust valve is opened and vice versa, and yet both exhaust valves are open when the cam shaft is at center or at any point of movement between center and a few degrees at either side thereof. Since the "center" position of the cam shaft (Fig. 20) represents a "neutral" condition when it is important that there be no passage of air through the inlet valves into the lines they control, the central overlap zone of the exhaust cams and valves insures that if the shaft be not stopped exactly on center when it is intended to put the machine in neutral condition, any air leaking through the inlet valves will be vented through the exhaust valves rather than building up pressure in the power lines.

Cam shaft 216a is oscillated by a crank 230a (Fig. 16) which is actuated through link 231a from control mechanism I (Figs. 23 and 24). When crank 230a is erect (Fig. 20) the valve mechanism is in "neutral" condition. Exhaust valve 213a is held open by cam 226a and inlet valve 211a is closed, it following that clamp cylinder 95a is exhausted and clamp spring 100a is holding cup 86a up in its clamping position. Exhaust valve 214a is held open by cam 229a and inlet valve 212a is closed, it resulting that the air cylinders 61a and 164a, of valves Ea and Ga, respectively, are vented, the springs 77a and 165a are holding their respective valve plungers in seated condition and thus keeping valves Ea and Ga closed, or in "neutral" condition, so there is no flow of liquid through meter M or head Da.

When crank 230a is swung in a clockwise direction to the position of Figs. 15 and 16, the machine is in "delivery" condition. With crank 230a and shaft 216a in "delivery" position, cam 226a causes exhaust valve 213a to remain open and inlet valve 211a remains closed, so there is no change in the condition of clamp Ha. But cam 228a has opened inlet valve 212a and cam 229a has allowed valve 214a to be spring-closed, it following that compressed air is admitted from line 195a to the air cylinders 61a and 164a, which causes valves Ea and Ga to open and permit metered delivery of liquid to container Ca, as will later be discussed in more detail.

When crank 230a is swung in a counter-clockwise direction to the position of Fig. 21, the unit B is in "clamp-release" condition. With crank 230a and shaft 216a in "clamp-release" positions, inlet valve 212a is reclosed and cam 229a is again holding exhaust valve 214a open, thus venting cylinders 61a and 164a so springs 77a and 165a are again holding valves Ea and Ga closed with consequent stoppage of liquid flow through the meter and filling head Da. On the other hand, cam 226a has allowed exhaust valve 213a to close, and cam 227a has opened inlet valve 211a, it following that compressed air from line 195a flows through pipe 107a to clamp-cylinder 95a and depresses cup 86a to move clamp Ha to release position—a position similar to that indicated for clamp H in Fig. 8.

It will be noted that the inlet cams are so relatively placed on shaft 216a, that at no time can both inlet valves 211a and 212a be open. It follows that there is no possibility of releasing the container clamp Ha during the time liquid delivery is being made to container Ca. The advantages of this feature are obvious.

Link 231a connects crank 230a with a parallel, equal-length crank 232a which is pinned to control or rock shaft 233a. Shaft 233a (Figs. 1, 23 and 24) is journaled in central bearing 234 and bearings 235a carried by base member 236a; the hub 237a of sector 238a (Fig. 24) being pinned to the shaft and, in coaction with bearings 235a, positioning the shaft endwise. An operating handle 239a (Fig. 23) is clamped to the shaft at 240a for oscillating it, and the handle is axially parallel with cranks 230a and 232a, it following that the relative positions of crank 230a and crank shaft 216a previously given for "neutral," "delivery" and "clamp-release" conditions, apply also to the position of operating handle 239a. It will be noted that shaft 233 of unit A and shaft 233a of unit B are capable of limited relative rotation so selective actuation of handles 239 and 239a selectively controls units A and B, respectively. However, I will later describe an interlock whereby, at times, rotational capability of one shaft in a given direction is dependent upon the angular position of the other shaft.

Detent mechanism La (Fig. 24) includes a sector 238a which is fixed to and rocks with shaft 233a. The sector has three positioning notches 241a, 242a and 243a, and end-stops 244a and 245a. A detent, generally indicated at 246a, comprises an arm 247a pivoted at 248a on member 236a, and a spring 249a constantly biasing arm roller 250a against the sector. The spring-pressed engagement of roller 250a with notches 241a, 242a and 243a, tends yieldably to hold sector 238a (and hence shaft 233a, cranks 232a, 230a and cam shaft 216a) in "delivery," "neutral" or "clamp-release" positions, respectively. Stops 244a and 245a, in their engagement with roller 250a, positively limit the total extent of rock shaft and cam shaft rotation, and prevent serious over-running beyond "clamp-release" and "delivery" positions. However, notch 232a is somewhat extended to allow slight over-run when the shafts are initially moved to "delivery" positions, in order that a later described latch may take effect, whereupon the shafts are rotated back to exact "delivery" position by the cam action of the roller.

I provide restoring or spring-return means Ra (Figs. 3 and 25) tending to rotate cam shaft 216a and hence—through crank 230a, link 231a and crank 232a—control shaft 233a back to "neutral" position from "delivery" position. In other words, after the valves have all been moved to "delivery" positions, the restoring means tends to return those valves—and all mechanism controlled thereby—to "neutral" condition.

The restoring means is in the form of a compression spring 251a on rod 231a. The spring is interposed between the stop collar 252a on link 231a and a stop 253a, represented by a post 254a extending upwardly from the base 255a of housing section 192a. When link 231a is in "neutral" position, spring 251a is relatively uncompressed, but when the rod and the cam shaft are in "delivery" positions (Fig. 25) the spring is effectively compressed between stop 252a and 253a. Spring 251a, when in the condition of Fig. 25, is of greater effective force than detent spring 249a, and thus tends to rotate the entire mechanism back to "neutral." The spring is effective at least long enough to allow detent roller 250a to start into sector-notch 242a, whereupon the detent spring causes the roller to cam the sector and hence all the control mechanism into exact "neutral" condition, and then acts releasably to hold them in such condition. Spring 251a is ineffective when the controlling mechanism is moved from "neutral" to "clamp-releasing" condition, or vice versa.

For reasons which will appear, I provide latch means Pa for releasably locking the control mechanism and valves in "delivery" condition and against the restoring action of spring 251a. The latch means Pa includes a latch bar 256a pivoted at 257a to base 255a and constantly urged upwardly by spring 258a to engage its hook 259a with latch collar 260a which is keyed to cam shaft 216a. When the cam shaft is in "delivery" position (Figs. 15 and 25) the collar 260 is in such position that hook 259 engages behind collar-shoulder 216a, the cam shaft thus being releasably held against counterclockwise movement (as viewed in Fig. 25), and thus being held in "delivery" condition against the effort of spring 251a to restore it to neutral position. Upon release of hook 259a from shoulder 261a, spring 251a is effective to rotate shaft 216a and collar 260a in a counterclockwise direction and thereafter hook 259a ineffectively engages the cylindrical face of the collar until shoulder 261a is again lined up with hook 259a.

In order to release latch Pa automatically when the delivery operation is completed, I provide the trip mechanism Qa (Fig. 25). This mechanism includes a cylinder 262a supported on a post 263a extending upwardly from base 255a. Sliding in the bore 264a of this cylinder, is a piston 265a carrying a piston rod 266a which extends downwardly through the counterbore 267a and bore 268a. The rod 266a directly overlies the tail 269a of latch bar 256a. Spring 270a, in counterbore 267a, is normally adapted to hold piston 265a at the top of its stroke, in which position rod 266a is sufficiently high that latch hook 259a may engage shoulder 261a. Pipe 191 leads from liquid-line pipe 190, as previously described, and into the top of cylinder bore 264a. Spring 270a is of sufficient strength to hold the piston in the position of Fig. 25 against the effective liquid pressure normally existing in pipe 191 and the top of the cylinder. However, when this pressure exceeds a certain value, under circumstances to be described, piston 265a is depressed, against the action of spring 270a, and rod 266a depresses tail 269a sufficiently to clear hook 259a from shoulder 261a, whereupon spring 251a restores all valves and controls associated with link 231a to "neutral" positions.

Interlock S (Figs. 22 and 23) is provided so, when liquid is being delivered by one delivery head, it is impossible for the operator to move the valves of the other head to "delivery" condition. Thus, so long as the mechanism of one unit A or B is latched in "delivery" condition, the mechanism of the other unit is locked out of "delivery" condition. Then, when the one unit has delivered a predetermined volume of liquid, it is automatically restored to "neutral" condition and the other unit is automatically "unlocked" so it is in condition to respond when the operator attempts to put it in "delivery" condition. Since the unlatching of the one unit is effected automatically upon its delivery of a predetermined volume of liquid, the release of the other unit for delivery-operation is also effected automatically upon delivery by the first unit of said predetermined volume.

The interlock includes a tilt-bar 271 (Fig. 22) mounted on a horizontal pivot pin 272 supported by bearings 234 and 273. Bar 271 has arms 274 and 274a extending from opposite sides of pivot 272 and having terminal pins 275 and 275a, respectively. Pins 275 and 275a underlie pins 276 and 276a carried by operating handles 239 and 239a, respectively.

When both handles 239 and 239a are vertical, indicating that both units A and B are in "neutral" condition throughout, the tilt bar 271 is ineffective, both pins 276 and 276a, being in the angular position of pin 276 in Figs. 22 and 23. However, when the operating handle of one of the units is swung in a clockwise direction (as viewed in Fig. 23) to put that unit into "delivery" condition, the associated pin 276 or 276a will depress the associated bar pin 275 or 275a to an extent which will tilt bar 271 to a position where the other bar pin engages the underside of the other handle-pin (if the other handle is in "neutral") and thus prevents said other handle from being swung to "delivery" position. Thus, in Figs. 22 and 23 the pin 276a on handle 239a has depressed tilt-bar arm 274a sufficiently to bring bar pin 275 into engagement with the underside of handle-pin 276, it following that handle 239 cannot be rotated into "delivery" position—and this condition of interlock will prevail so long as latch Pa holds unit B in delivery condition. However, the tilt bar does not prevent handle 239 from swinging in a counterclockwise direction (as viewed in Fig. 23) to rotate shaft 233 in a manner to control the clamp-release mechanism of unit A.

As soon as handle 239a, is restored to "neutral" position by the automatic release of latch Pa and the action of restoring spring 251a, bar 271 is freed from restraint, so handle 239 may be swung to "delivery" position, but this movement, in turn, swings bar-pin 275a to a position which prevents handle 239a from being re-swung to "delivery" position.

In Figs. 26, 27 and 28, the schematic showing is such that the movement of the latch collars 260 and 260a is rectilinear rather than rotative, such a showing lending itself better to a simplified diagram. Accordingly, interlock S is illustrated as a solid rod extending from unit to unit, heads 275 and 275a being adapted to coact with handle pins 276 and 276a, respectively, for interlocking purposes.

In Fig. 26, all elements of unit A are shown in "neutral" condition and all elements of unit B are shown in "delivery" condition. Fig. 27 shows certain elements of unit B in "neutral" condition, and Fig. 28 shows those same elements in "clamp-release" condition.

Assuming the valve system is in the condition of Fig. 26, all elements are in the conditions shown in the other figures (with the exception of Figs. 5, 8, 20, 21, 27 and 28). Latch Pa is in the condition of Fig. 25, thus holding cam shaft 216a against counterclockwise movement, so the valves controlled by that shaft may be considered as latched in the positions of Fig. 15. Thus, air inlet valve 212a is latched open and air exhaust valve 214a is latched closed, so compressed air admitted through line 195a is effective through lines 170a and 76a to hold valves Ea and Ga open. Air inlet valve 211a is latched closed and air exhaust valve 213a is latched open, so spring 100a is effective to retain container Ca clamped to head Da. Interlock S, now in the position of Fig. 22, prevents control I from being actuated to "delivery" condition and thereby prevents delivery through unit A. The interlock may thus be considered as latched in its present position by mechanism Pa, and, since the interlock holds the valves of unit A from being moved to "delivery" position, mechanism Pa may also be considered as latching said valves in an "off" condition.

Since valve Ga is open, the pressurized liquid in line 125 enters cylinder end 181 of meter M (Fig. 14) through duct 139a and line 159a, driving piston 175 to the right. Since valve Ea is open, the liquid in the meter-cylinder-end 181a (which represents a predetermined, measured volume of liquid and which was admitted to the meter as piston-powering means during the immediately preceding piston stroke) is forced through line 55a, head Da, valve Ea and nozzle 31a into container Ca. The flow into the container continues until piston 175 strikes stop 179a. During this movement of the piston, the pressure in line 191 as applied to trip-piston 265a, is insufficient to trip latch bar 256a, so all valves of unit B remain latched in "delivery" positions.

While container Ca is being filled, the operator is free to move handle 239 in a counterclockwise direction (as viewed in Fig. 23) though the interlock S prevents it from being moved in a clockwise direction. Movement of handle 239 in a counterclockwise direction shifts the controls and valves of unit A to "clamp-release" position, it following that compressed air from line 195 is admitted to clamp cylinder 95, depressing cup 86 against the action of spring 100, and allowing a full container C to be replaced by an empty one. With the empty container in place, control I is returned to neutral position, thus shutting off the air inlet to cylinder 95 and exhausting the compressed air within that cylinder, whereupon spring 100 raises cup 86 and clamps the new container against head D for subsequent delivery of liquid through unit A.

When meter piston 175 strikes stop 179a, meaning a full, predetermined liquid charge has been delivered to container Ca, flow to the container ceases. Since the piston can move no further to the right, the pressure of the liquid in end 181 and line 191 is immediately built up to a value sufficient to overpower spring 270a in trip Qa (Fig. 25). Piston 265a is therefore depressed and acts through rod 266a to trip the bar 256a, clearing hook 259a from shoulder 261a. Spring 251a then immediately returns the valve-controls and valves of unit B to "neutral" positions, as previously described.

The interlocking bar 271 is thus freed from the restraint of handle pin 276a, and unit A may therefore immediately be put into "delivery" condition by rotating handle 239 in a clockwise direction (as viewed in Fig. 25), whereupon bar 271 becomes effective to hold control Ia from being actuated to put unit B into delivery condition, through permitting it to be actuated to release clamp Ha for replacement of full container Ca by an empty container.

As soon as the valves of unit A are in delivery condition (valves G and E being open) liquid from line 125 powers the piston to move it towards stop 179, while the liquid just previously admitted to cylinder end 181 (to power the piston in its preceding stroke, and representing the predetermined measured charge) is forced through line 55, head D, valve E and nozzle 31 into the associated container. As soon as valve E opens to admit liquid to the container, the pressure in line 191 drops sufficiently to allow spring 270a in trip Qa to elevate rod 266a, thus freeing latch bar 256a (Fig. 25) so, upon subsequent rotation of cam shaft 216a to "delivery" position, hook 259a will re-engage shoulder 261a and thus latch the cam shaft and all associated mechanism in that condition.

The replacement, in a given unit, of full containers with empty containers may normally be accomplished in less time than it requires to fill the container being serviced by the other unit. Therefore the operator, after clamping an empty container in place, may put manual pressure on the operating handle of the idle unit and then, when the interlock is automatically released by the tripping of the latch of the active unit, such manual pressure is immediately effective to actuate the controls in a manner to start the delivery cycle of the previously idle unit.

While I have illustrated and described a preferred embodiment of my invention, it is to be understood that various changes in design, structure and arrangement may be made without departing from the spirit and scope of the appended claims.

I claim:

1. In a machine for filling a container with liquid from a supply line and through a filling opening in the container, a filling head adapted to have inlet connection with the supply line and having a delivery orifice, a releasable clamp adapted to hold a container to the head with the delivery orifice in register with the filling opening, a valve for controlling liquid flow through the delivery orifice, means for opening and closing said valve, means for applying said clamp, means for releasing said clamp, and means associated with the clamp releasing means and the valve opening means whereby, when said valve is open, said clamp releasing means is inoperable.

2. In a machine for filling a container with liquid from a supply line and through a filling opening in the container, a filling head adapted to have inlet connection with the supply line and having a delivery orifice, a releasable clamp adapted to hold a container to the head with the delivery orifice in register with the filling opening, a valve for controlling liquid flow through the delivery orifice, air pressure means for opening said valve, air pressure means for releasing said clamp, a control valve for controlling said valve-opening pressure means, and a control valve for controlling said clamp-releasing pressure means, said control valves being connected in a manner whereby, when the first mentioned control valve is open, the second mentioned control valve is closed.

3. In a machine for filling a container with liquid from a supply line and through a filling opening in the container, a filling head adapted to have inlet connection with the supply line and having a delivery orifice, a releasable clamp adapted to hold a container to the head with the delivery orifice in register with the filling opening, a valve for controlling liquid flow through the delivery orifice, air pressure means for opening said valve, air pressure means for releasing said clamp, a control valve for controlling said valve-opening pressure means, a control valve for controlling said clamp-releasing pressure means, said control valves being connected in a manner whereby, when the first mentioned control valve is open, the second mentioned control valve is closed, and selectively operable means for operating the two control valves sequentially.

4. In a machine for filling a container with liquid from a supply line and through a filling opening in the container, a filling head adapted to have inlet connection with the supply line and having a delivery orifice, a releasable clamp adapted to hold a container to the head with the delivery orifice in register with the filling opening, a valve for controlling liquid flow through the delivery orifice, means for opening said valve, means for applying said clamp, means for releasing said clamp, means associated with the clamp releasing means and the valve opening means whereby, when said valve is open, said clamp releasing means is inoperable, and means acting automatically to cause closing movement of said valve by virtue of predetermined volumetric flow of liquid through the orifice.

5. In a machine for filling a container with liquid from a supply line and through a filling opening in the container, a filling head adapted to have inlet connection with the supply line and having a delivery orifice, a valve for controlling liquid flow through the delivery orifice, means for opening said valve, and means acting automatically to cause closing movement of said valve by virtue of predetermined volumetric flow through the orifice.

6. In a machine for filling a container with liquid from a supply line and through a filling opening in the container, a filling head adapted to have inlet connection with the supply line and having a delivery orifice, a releasable clamp adapted to hold a container to the head with the delivery orifice in register with the filling opening, a valve for controlling liquid flow through the delivery orifice, means for opening and closing said valve, means for applying said clamp, means for releasing said clamp, means associated with the clamp releasing means and the valve opening means whereby, when said valve is open, said clamp releasing means is inoperable, and means acting automatically, when said valve is subsequently closed, to restore the clamp releasing means to operable condition.

7. In a machine for filling a container with liquid from a supply line, the container having a filling opening in one wall thereof, a filling head adapted to have inlet connection with the supply line and having a delivery orifice, a holding member arranged in spaced relation with respect to the head and movable to and from a position adapted to hold the container in a position with its filling opening in register with the delivery orifice, and container-locating means associated with the filling head and holding member and adapted to position the container so its filling opening is lined up with the delivery orifice when the container is thrust between the head and the holding member while the latter is out of holding position; said locating means embodying a pair of spaced arms having free ends adapted to take the container between them, and a circular head at the free end of one of the arms, said head being mounted for eccentric movement to vary its effective spacing from the other arm, and releasable means for holding said head against eccentric movement.

8. In a machine for alternately filling a pair of containers with liquid from a supply line, a pair of filling heads, each adapted to have inlet connection with the supply line and having a delivery orifice, a pair of valves, one for each head and for controlling liquid flow through the delivery orifice of that head, means for selectively opening said valves, and means operated by virtue of the opening of one valve to prevent the opening of the other valve.

9. In a machine for alternately filling a pair of containers with liquid from a supply line, a pair of filling heads, each adapted to have inlet connection with the supply line and having a delivery orifice, a pair of valves, one for each head and for controlling liquid flow through the delivery orifice of that head, means for selectively opening said valves, and means acting automatically to close an open valve by virtue of predetermined volumetric flow of liquid therethrough.

10. In a machine for alternately filling a pair of containers with liquid from a supply line, a pair of filling heads, each adapted to have inlet connection with the supply line and having a delivery orifice, a pair of valves, one for each head and for controlling liquid flow through the delivery orifice of that head, means for selectively opening said valves, means operated by virtue of the opening of one valve to prevent the opening of the other valve, and means acting automatically to cause closing movement of the open valve and to free the closed valve for opening movement by virtue of predetermined volumetric flow of liquid through the open valve.

11. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, and means for simultaneously opening the inlet valve which controls delivery to one end of the cylinder and opening the outlet valve at the other end of the cylinder.

12. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, and means acting automatically to simultaneously close both said last mentioned valves by virtue of the piston reaching said other end of the cylinder.

13. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, and releasable means preventing opening of the other valves while the last mentioned valves are open.

14. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, releasable means preventing opening of the other valves while the last mentioned valves are open, and means acting automatically to simultaneously close the open valves and to release said preventing means, by virtue of predetermined volumetric delivery of liquid through the delivery orifice.

15. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, releasable means preventing opening of the other valves while the last mentioned valves are open, and means acting automatically to release said preventing means, by virtue of predetermined volumetric delivery of liquid through the delivery orifice.

16. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, a latch mechanism preventing opening of the other valves while the last mentioned valves are open, and means for tripping the latch by virtue of the piston reaching said other end of the cylinder.

17. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, a latch mechanism preventing opening of the other valves while the last mentioned valves are open, and means for tripping the latch by virtue of the piston reaching said other end of the cylinder; said last mentioned means embodying a second cylinder, a second piston movable through the second cylinder to and from latch-tripping position, yieldable means normally holding the second piston out of latch-tripping position, said cylinder being in communication with the active inlet end of the meter cylinder whereby, when the floating piston reaches the other end of the meter cylinder, pressure is built up in the second cylinder sufficiently to move the second piston to latch-tripping position.

18. In a machine for alternately filling a pair of containers with liquid from a supply line, a pair of filling heads, each adapted to have inlet connection with the supply line and having a delivery orifice, a meter embodying a cylinder and a floating piston in said cylinder, an inlet line to the meter adapted for connection to the supply line, an outlet line running from one end of the cylinder to one of the heads, an outlet line running from the other end of the cylinder to the other head, a pair of inlet valves selectively operable to open the inlet line to opposite ends of the cylinder, a pair of outlet valves, one in each outlet line, means for simultaneously opening the inlet valve which controls delivery to one end of the cylinder and opening the outlet valve at the other end of the cylinder, a latch mechanism preventing opening of the other valves while the last mentioned valves are open, means for tripping the latch by virtue of the piston reaching said other end of the cylinder, and means acting automatically to close the open valves when the latch is tripped.

19. In a machine for filling a container with liquid from a supply line, the machine being adapted to have inlet connection with the supply line and having a liquid delivery orifice, there being a flow line through the machine leading from the inlet connection to the delivery orifice; a valve in said flow line embodying a valve seat, a cylinder, a piston, and a valve stopper carried by the piston, said piston being movable through the cylinder to seat and unseat the stopper, a pressure-taking face on said piston exposed to the liquid in the flow line in a manner whereby the pressure of the liquid tends to move the piston in a direction to unseat the stopper, yieldable means applied to the piston to hold the stopper seated with sufficient force to offset the valve-opening tendency of the liquid, a second pressure-taking face on the piston, and means for applying air pressure to said second face in a direction and in amount sufficient to unseat the stopper.

20. In a machine for filling a container with liquid from a supply line, the machine being adapted to have inlet connection with the supply line and having a liquid delivery orifice, there being a flow line through the machine leading from the inlet connection to the delivery orifice; a valve in said flow line embodying a valve seat, a cylinder, a piston, and a valve stopper carried by the piston, said piston being movable through the cylinder to seat and unseat the stopper, a pressure-taking face on said piston exposed to the liquid in the flow line in a manner whereby the pressure of the liquid tends to move the piston in a direction to unseat the stopper, yieldable means applied to the piston to hold the stopper seated with sufficient force to offset the valve-opening tendency of the liquid, a second pressure-taking face on said piston facing in the same direction as the first mentioned face but of greater effective area, and means for applying air pressure to said second face in amount sufficient to unseat said stopper.

21. In a machine for filling a container with liquid from a supply line, the container having a filling opening in one wall thereof, a filling head adapted to have inlet connection with the supply line and having a delivery orifice, a holding member arranged in spaced relation with respect to the head and movable to and from a position adapted to hold the container in a position with its filling opening in register with the delivery orifice, and container-locating means associated with the filling head and holding member and adapted to position the container so its filling opening is lined up with the delivery orifice when the container is thrust between the head and the holding member while the latter is out of holding position, said locator including angularly spaced rollers adapted to engage the container and to roll therealong when the holding member is subsequently moved towards holding position.

22. In a machine for filling a container with liquid from a supply line, the container having a filling opening in one wall thereof, a filling head adapted to have inlet connection with the supply line and having a delivery orifice, a holding member arranged in spaced relation with respect to the head and movable to and from a position adapted to hold the container in a position with its filling opening in register with the delivery orifice, and container-locating means associated with the filling head and holding member and adapted to position the container so its filling opening is lined up with the delivery orifice when the container is thrust between the head and the holding member while the latter is out of holding position; said locating means embodying a pair of spaced arms having free ends adapted to take the container between them, and a roller at the free end of one of the arms, said roller being freely rotatable on the arm and being mounted for eccentric movement to vary its effective spacing from the other arm, and releasable means for holding said head against eccentric movement.

23. In a machine for filling a container with liquid from a supply line and through a filling opening in the container, a filling head adapted to have inlet connection with the supply line and having a delivery orifice, a valve for controlling liquid flow through the delivery orifice, means for opening said valve, releasable latch mechanism adapted to hold the valve open, and means for tripping the latch while the valve is open.

24. In a machine for filling a container with liquid from a supply line and through a filling opening in the container, a filling head adapted to have inlet connection with the supply line and having a delivery orifice, a valve for controlling liquid flow through the delivery orifice, means for opening said valve, releasable latch mechanism adapted to hold the valve open, and fluid-pressure operated means for tripping the latch.

25. In a machine for filling a container with liquid from a supply line and through a filling opening in the container, a filling head adapted to have inlet connection with the supply line and having a delivery orifice, a valve for controlling liquid flow through the delivery orifice, means for opening said valve, releasable latch mechanism adapted to hold the valve open, and means for tripping the latch, said last mentioned means operating by virtue of predetermined volumetric flow of liquid through the orifice.

26. In a machine for filling a container with liquid from a supply line and through a filling opening in the container, a filling head adapted to have inlet connection with the supply line and having a delivery orifice, a valve for controlling liquid flow through the delivery orifice, means for opening said valve, releasable latch mechanism adapted to hold the valve open, means for tripping the latch while the valve is open, and means acting automatically to close the valve when the latch is tripped.

REUBEN STANLEY SMITH.

REFERENCES CITED

The following references are of record in the file of this patent:

UNITED STATES PATENTS

| Number | Name | Date |
|---|---|---|
| 797,124 | Kleinfeldt | Aug. 15, 1905 |
| 1,036,778 | Baker | Aug. 27, 1912 |
| 1,166,520 | Henes | Jan. 4, 1916 |
| 1,387,507 | Muller | Aug. 16, 1921 |
| 2,069,086 | Donovan et al. | Jan. 26, 1937 |
| 2,169,573 | Vogt | Aug. 15, 1939 |
| 2,222,617 | Hothersall et al. | Nov. 26, 1940 |
| 2,290,103 | Hohl et al. | July 14, 1942 |
| 2,406,263 | Clair et al. | Aug. 20, 1946 |

FOREIGN PATENTS

| Number | Country | Date |
|---|---|---|
| 274,675 | Germany | May 27, 1914 |